United States Patent [19]
Burris et al.

[11] Patent Number: 6,092,616
[45] Date of Patent: Jul. 25, 2000

[54] COOLING SYSTEM FOR A SKID STEER LOADER

[75] Inventors: Andrew Burris, Raleigh; H. Patrick Gaines, Cary; Timothy P. Graham, Apex; Jeffrey J. Griffith, Cary; Richard A. Naugle, Fuquay Varina; Reid W. Waitt, Willow Springs, all of N.C.

[73] Assignee: Caterpillar S.A.R.L., Geneva, Switzerland

[21] Appl. No.: 09/092,103

[22] Filed: Jun. 5, 1998

[51] Int. Cl.$^7$ ................................................. B60K 11/00
[52] U.S. Cl. ........................ 180/68.1; 180/68.3; 180/68.4
[58] Field of Search .................................. 180/68.1, 68.3, 180/68.4, 69.21, 68.6; 123/41.31, 41.43

[56] References Cited

U.S. PATENT DOCUMENTS

| | | | |
|---|---|---|---|
| 3,334,704 | 8/1967 | Gehrke et al. | 180/68 |
| 3,834,478 | 9/1974 | Alexander et al. | 180/68 P |
| 3,938,586 | 2/1976 | Barlow et al. | 165/51 |
| 4,117,902 | 10/1978 | Henline et al. | 180/54 R |
| 4,287,961 | 9/1981 | Steiger | 180/68 R |
| 4,535,868 | 8/1985 | Mather et al. | 180/297 |
| 4,696,361 | 9/1987 | Clark et al. | 180/68.4 |
| 4,815,550 | 3/1989 | Mather et al. | 180/68.1 |
| 4,825,815 | 5/1989 | Turner | 123/41.49 |
| 5,042,602 | 8/1991 | Nakatani et al. | 180/68.1 |
| 5,234,051 | 8/1993 | Weizenburger et al. | 165/41 |
| 5,564,514 | 10/1996 | Knight | 180/69.21 |
| 5,803,198 | 9/1998 | Baxter et al. | 180/69.21 |

*Primary Examiner*—Eric Culbreth
*Assistant Examiner*—L. Lum
*Attorney, Agent, or Firm*—Jeffrey A. Greene

[57] ABSTRACT

The cooling system for a skid steer loader provides a unitary assembly that is pivotally mounted to the body portion of the loader above the engine. The unitary assembly includes a frame, first and second heat exchangers, a shroud, a guard, a drive mechanism, and a fan. During times of maintenance on the work machine the entire cooling system can be moved to a second position providing unencumbered access to the engine compartment.

19 Claims, 4 Drawing Sheets

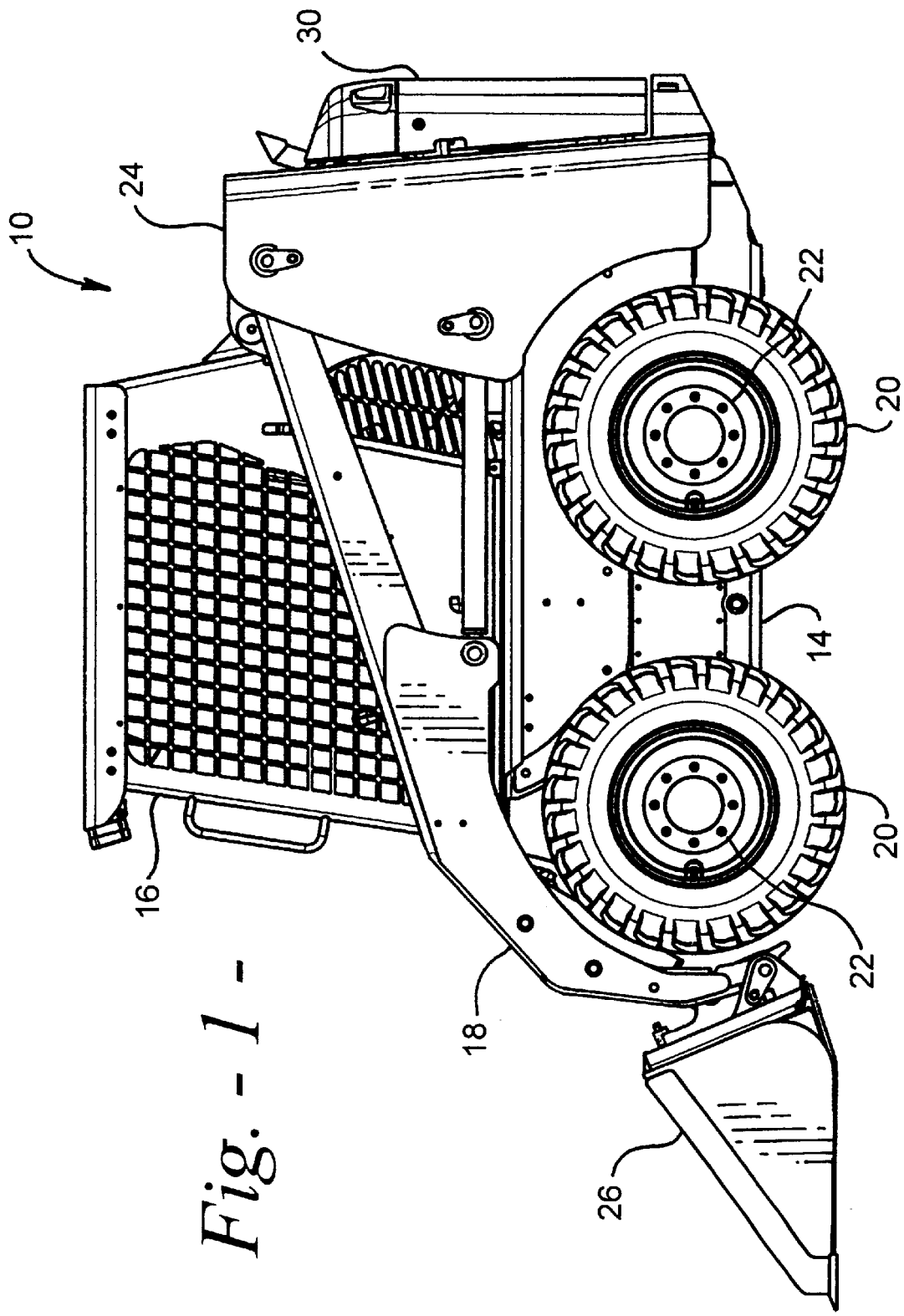

Fig. - 2 -
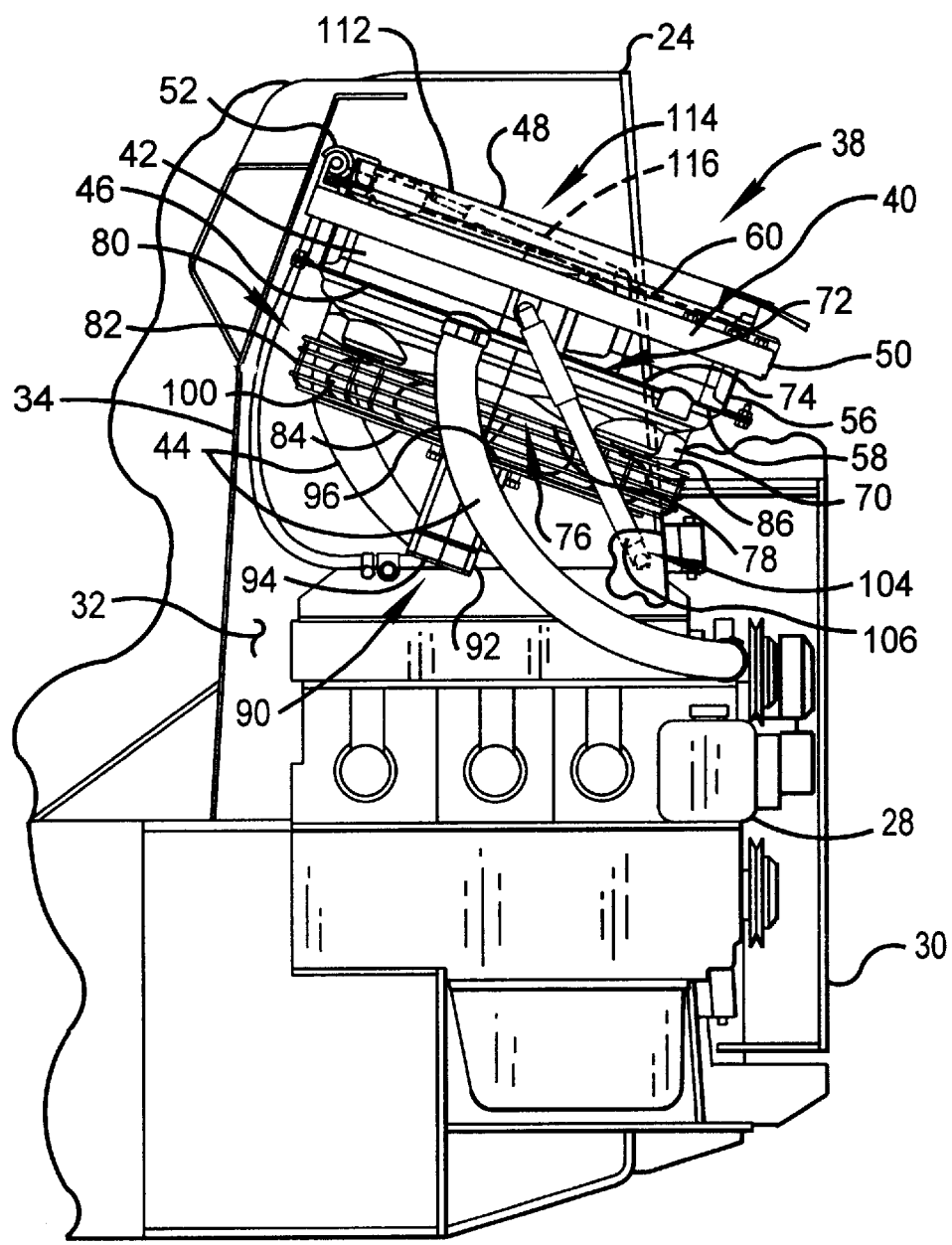

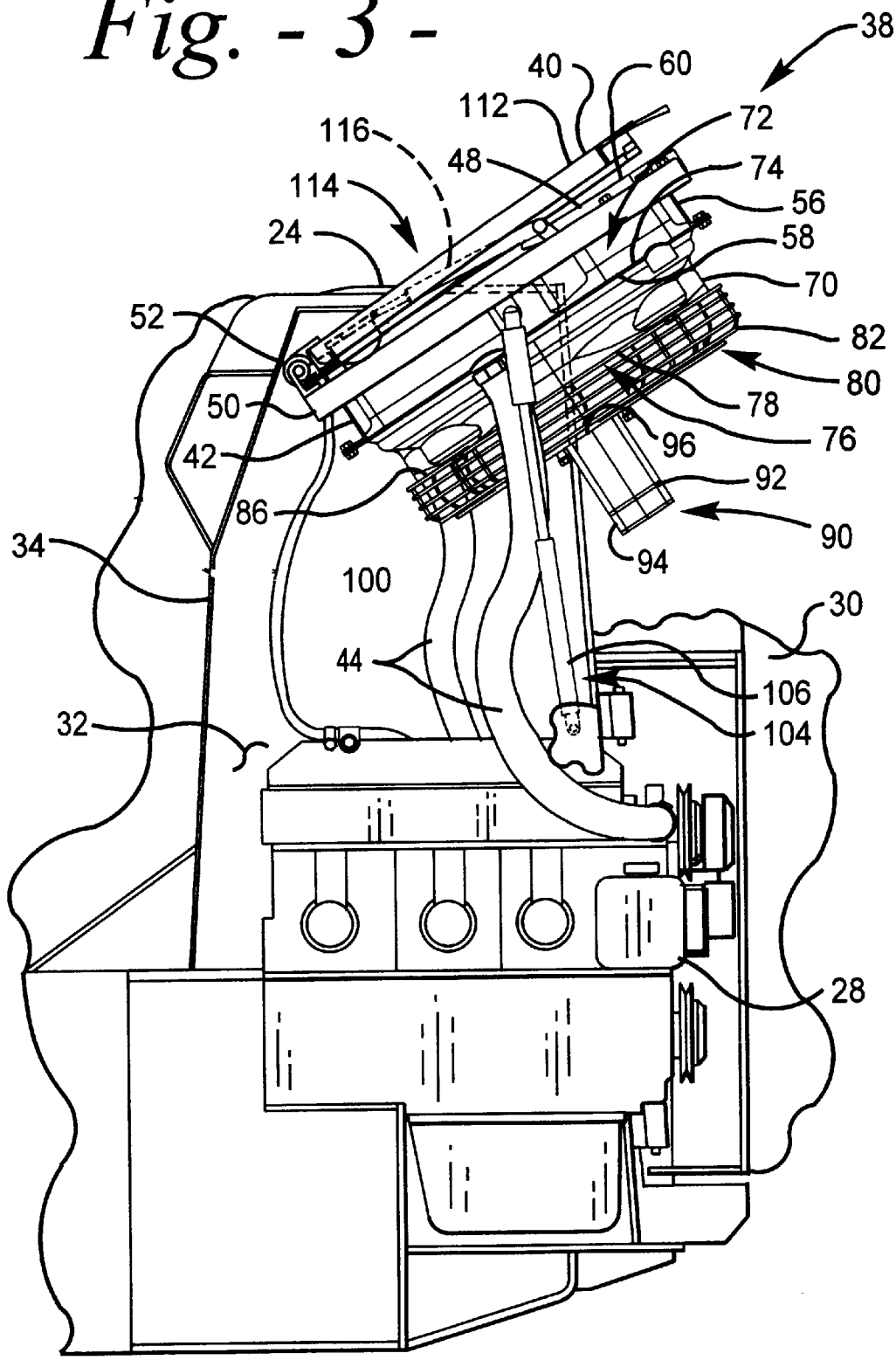
Fig. - 3 -

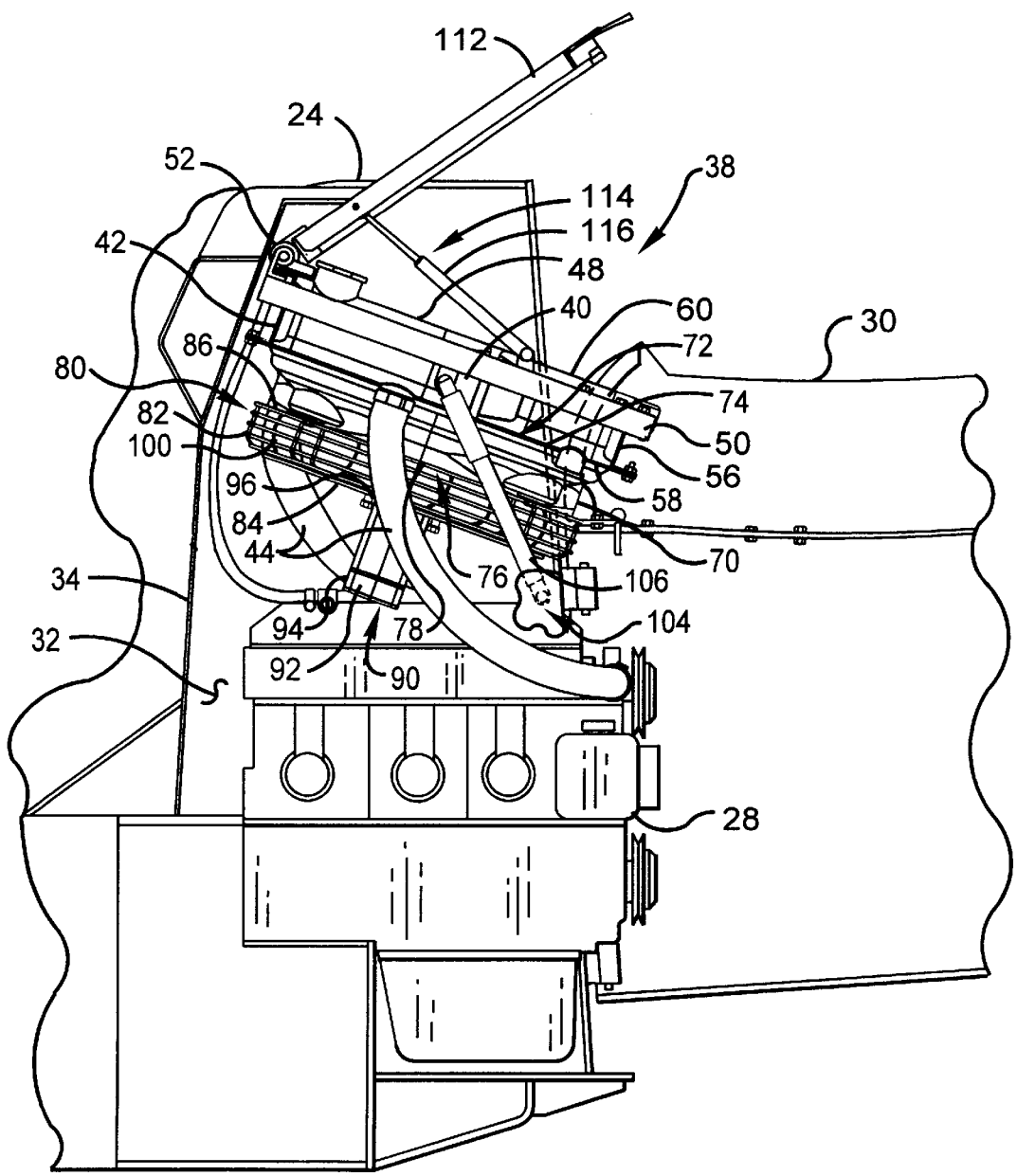
Fig. - 4 -

COOLING SYSTEM FOR A SKID STEER LOADER

TECHNICAL FIELD

The present invention relates to a cooling system for an internal combustion engine, and more particularly, to a pivotal cooling assembly for a skid steer loader.

BACKGROUND ART

Skid steer loaders are highly maneuverable compact work machines. These machines are commonly used in a variety of applications ranging from asphalt milling to earth moving, depending on the job and type of attachment being utilized. Maneuverability is enhanced by balancing the weight ratio between the front and rear axles during loaded and unloaded conditions. Balancing the weight ratio is accomplished, in part, by positioning the engine at the rear of the machine and the load or attachment being carried at the front. Accordingly, it is desirable to provide as compact a machine as possible while maintaining a favorable weight ratio balance.

The engine compartment in typical skid steer loader designs is located behind and sometimes extending underneath the operator's compartment. This configuration maintains the a favorable weight ratio balance while providing a compact machine. Examples of such machines are generally disclosed in U.S. Pat. No. 4,117,902 to Henline, U.S. Pat. No. 4,535,868 to Mather, and U.S. Pat. No. 4,815,550 Mather. In the patents disclosed above, various attempts have been made to position the engine and cooling systems to provide a compact design and supply a favorable weight ratio balance. However, due to the cooling arrangement of these machines, the engine compartments are typically cramped and general engine maintenance is difficult at best.

Another cooling system which is disclosed in U.S. Pat. No. 4,287,961 to Steiger, utilizes heat exchangers that are fixed to a rear closure. The rear closure is attached to the rear of the machine and is pivotal between an operating position and a maintenance position. In this configuration air is drawn through the engine compartment by a fan that is directly connected to the engine. The cooling air is then directed through a shroud to the heat exchangers. When general maintenance is to be performed the rear closure is pivoted to the maintenance position and the shroud removed before the engine is exposed.

In yet another arrangement disclosed in U.S. Pat. No. 4,696,361 to Clark, cooling air is drawn through louvers in a rear closure by a radial fan. The radial fan is located at the rear of the engine behind the operator compartment. The fan directs air through a plenum upwards to an overlaying or stacked oil cooler and radiator assembly. The heat exchangers in this dual assembly are independently pivotal from one another allowing access for maintenance and inspection. However, this arrangement is costly due to the number of components. More importantly this arrangement reduces the efficiency of the upper heat exchanger due to the increase in cooling air temperature after it has passed through the first lower heat exchanger.

The present invention is directed to overcome one or more of the problems as set forth above.

DISCLOSURE OF THE INVENTION

In one aspect of this invention a cooling system is provided for an earth working machine having a body portion with a pair of laterally spaced sides and a divider wall mounted on an end thereof. The sides of the body partially define an engine compartment for housing an engine, and the divider wall is disposed between the sides to separate the engine compartment from an operator's compartment. The cooling system is a unitary assembly including (1) a frame that is pivotally connected to the divider wall above the engine, (2) a first heat exchanger disposed between the sides and connected to the frame, (3) a second heat exchanger disposed between the sides and connected to the frame, (4) a shroud connected to the first and second heat exchangers, (5) a fan positioned in the shroud, (6) a guard surrounding the fan and connected to the bottom of the shroud, (7) a drive mechanism having an input end and an output end, and is connected to the guard, the output end thereof is connected to the fan and the input end thereof is connected to the engine. The unitary cooling assembly is pivotally movable between a first position and a second position.

In another aspect of the present invention, a cooling system is provided for a skid steer loader having a body portion including a pair of laterally spaced uprights and a divider wall mounted on an end thereof. The uprights partially define an engine compartment for housing an engine, and the divider wall is interposed the uprights and divides an operators compartment from the engine compartment. The cooling system has a generally rectangular frame that is pivotally connected to the divider wall above the engine. A first heat exchanger is disposed between the uprights and has an air intake side and an air discharge side. A second heat exchanger is disposed between the uprights and has an air inlet side and an air outlet side. A shroud having an intake aperture and a discharge aperture is connected to said first and second heat exchangers. A fan is positioned in the air intake aperture of the shroud. A guard surrounds the fan and forms an inlet and an outlet. The outlet of the guard is connected to the bottom of the shroud. A drive mechanism is connected to the guard and has an input end and an output end. The output end of the drive mechanism is connected to the fan, and the input end is connected to the engine. The cooling system is pivotally movable between a first position and a second position.

BRIEF DESCRIPTION OF THE DRAWINGS

FIG. 1 is a side view of a work machine employing the cooling system of the present invention;

FIG. 2 is a fragmentary side view of the rear of the work machine of FIG. 1 with portions cut away to illustrate the unitary cooling assembly in a working position;

FIG. 3 is a side view similar to FIG. 2 but illustrates the cooling system in a maintenance position; and FIG. 4 is a side view similar to FIGS. 2 and 3 but illustrates the cooling system with a protective grill shown in an inspection position.

BEST MODE FOR CARRYING OUT THE INVENTION

A work machine such as a skid steer loader 10 in accordance with the present invention is illustrated in FIG. 1. As shown the skid steer loader 10 includes a body portion 14, an operators compartment 16, and a lift arm assembly 18. Front and rear sets of wheels 20 are mounted to stub axles 22 which extend from each side of the body portion 14. The lift arm assembly 18 is pivotally mounted to laterally spaced side members or uprights 24 at the rear of the body portion 14 and pivotally carry a bucket or other implement 26 at the forward end thereof. It should be recognized that the skid steer loader 10 could be belt/track driven or could have a belt entrained around front and rear wheels 20.

As best seen in FIGS. 2 through 4, an engine 28 is housed in an engine compartment 32, defined by body portion 14, the uprights 24, a rear closure 30, a divider wall 34, and a cooling system generally designated by 38. Divider wall 34 is disposed between the uprights 24 separating the engine compartment 32 and the operators compartment 16. The rear closure 30 is hingably mounted to one of the uprights at the rear of the body portion for providing access to the engine 28.

The cooling system 38 of the present invention is a unitary assembly 40 and employs engine 28 for powering the skid steer loader 10. The engine 28 is cooled by liquid coolant which is circulated through a first heat exchanger 42. The first heat exchanger 42 is connected to the engine 28 by a pair of first hoses 44 which permit the flow of coolant from the engine 28 through the first heat exchanger 42 and then back. The first heat exchanger 42 is disposed between the uprights 24 and has an air intake side 46 and an air discharge side 48. The air discharge side 48 of the first heat exchanger 42 is mounted to a frame 50 proximal the divider wall 34 in a suitable manner. Frame 50, which is generally rectangular in shape and manufactured from square tubing, is pivotally connected to the divider wall 34 above the engine 28 by a pair of suitable hinges 52 only one of which is shown.

A second heat exchanger 56 is disposed between the uprights 24 has an air inlet side 58 and an air outlet side 60. The air outlet side 60 of the second heat exchanger 56 is mounted to frame 50 by fasteners, adjacent the first heat exchanger 42 distal the divider wall 34. A pair of conduits, not shown is connected to the second heat exchanger 56 and to a conventional hydraulic system, not shown, that is in turn connected to the engine 28. The hydraulic system circulates hydraulic fluid through the pair of conduits and the second heat exchanger 56 for cooling the hydraulic fluid.

A shroud 70 has a top 72 which forms a discharge aperture 74 and a bottom 76 which forms an inlet aperture 78. The top 72 of shroud 70 is connected to the air intake side 46 of the first heat exchanger 42 and the air inlet side 58 of the second heat exchanger 56. Shroud 70 forms an air plenum for simultaneously directing forced cooling air through the first and second heat exchangers 42,56.

A guard 80 formed of wire creates a wire mesh frame 82 which has an inlet 84 and an outlet 86. Outlet 86 is connected to the bottom 76 of the shroud 70. A drive mechanism 90 is connected to the inlet 84 of the guard 80. The drive mechanism 90 is a motor 92, preferably a hydraulic motor, having an input end 94 and an output end 96. The input end 94 is connected to the hydraulic system and the output end 96 is connected to a fan 100. Fan 100 is positioned in the intake aperture 78 of the shroud 70 so that the guard 80 surrounds the fan 100.

A support mechanism 104 is pivotally connected between the frame 50 and one of the uprights 24. Support mechanism 104 is gas spring 106. When the cooling assembly 38 is in a first position, as shown in FIG. 2, any suitable latch arrangement or hold-down, not shown, could be mounted to the frame 50 and to one of the uprights 24 to hold the cooling assembly 38 in a fixed position. As an alternative, support mechanism 104 could utilize an over center action to perform this function. The unitary assembly 40 is pivotally movable to a second position as shown in FIG. 3. In the second position the support mechanism 104 is extended and supports the unitary assembly 40.

A protective grill 112, formed from perforated sheet metal, is positioned over the first and second heat exchangers 42,56 to prevent damage during operation of the skid steer loader 10. The protective grill 112 is also pivotally connected to the pair of hinges 52, but is movable with or independent of the pivotal movement of the unitary assembly 40.

A grill support mechanism 114 is pivotally connected to the frame 50 and to the protective grill 112. Support mechanism 114 is oil damper 116. As with support mechanism 104, any suitable latch arrangement or hold-down, not shown, could be mounted to the frame 50 and to the protective grill 112 to hold the protective grill 112 in a first position as seen in FIGS. 2 and 3. As an alternative, grill support mechanism 114 could utilize an over center action to perform this function. The protective grill 112 is pivotally movable to a second position as best seen in FIG. 4. In the second position the support mechanism 114 is extended and supports the protective grill 112.

INDUSTRIAL APPLICABILITY

In a normal operating position, the unitary assembly 40 is in the first position shown in FIG. 2 and the rear closure 30 is closed against the upright 24. The engine 28 may then be started and hydraulic fluid from the system actuates the hydraulic motor 92 and begins to rotate the fan 100. Cooling air is drawn into the operators compartment 16 under the divider wall 34 and into the engine compartment 32 around engine 28 and through the unitary assembly 40.

During times of preventative maintenance, of the cooling system 38 the rear closure 30 is pivoted to an open position and protective grill 112 can be moved from a first position to a second position as seen in FIG. 4. Oil damper 116 maintains protective grill 112 in the upper position providing access to, the first and second heat exchangers 42,56. This exposes the first and second heat exchangers 42,56 for inspection or cleaning and to provide access to the radiator fill cap.

When maintenance on engine 28 of the work machine 10 is required, the rear closure 30 is also pivoted to an open position, and the unitary assembly 40 can then be pivoted from a first to a second position as shown in FIG. 3. Gas spring 106 will then support the unitary assembly 40 in a pivoted position, up an away from the engine compartment 32 and the engine 28. This allows the operator to perform maintenance of any kind in the engine compartment 32 without first having to dismantle a number of cooling system 38 components before gaining access to the engine 28.

Other aspects, objects and advantages of this invention can be obtained from a study of the drawings, the disclosure, and the appended claims.

What is claimed is:

1. A cooling system for a working machine having a body portion with a pair of laterally spaced sides and a divider wall mounted on an end thereof wherein the sides partially define an engine compartment for housing an engine and the divider wall being disposed between the sides to separate the engine compartment from an operator's compartment said cooling system comprising:

a unitary assembly including, (1) a frame being pivotally connected to the divider wall above the engine, (2) a first heat exchanger being disposed between the sides and connected to the frame, (3) a second heat exchanger being disposed between the sides and connected to the frame, (4) a shroud being connected to the first and second heat exchangers, (5) a fan positioned in the shroud, (6) a guard surrounding the fan and being connected to the bottom of the shroud, (7) a drive mechanism having an input end and an output end being connected to the guard, the output end being connected to the fan, and the input end being connected to the engine; and said unitary assembly being pivotally movable between a first position and a second position.

2. The cooling system of claim 1 wherein the first heat exchanger is connected to the frame proximal the divider wall, and the second heat exchanger is positioned adjacent the first heat exchanger and is connected to the frame distal the divider wall.

3. The cooling system of claim 1 wherein the guard comprises a wire mesh frame.

4. The cooling system of claim 1 further including a support mechanism being pivotally connected between the frame and one side, for supporting said unitary assembly in the second position.

5. The cooling system of claim 4 wherein said support mechanism comprises a gas spring.

6. The cooling system of claim 1 further including a protective grill positioned above the frame.

7. The cooling system of claim 6 wherein said protective grill is pivotally moveable between a first position and a second position, independent of the pivotal movement of said unitary assembly.

8. The cooling system of claim 1 wherein said drive mechanism comprises a motor.

9. The cooling system of claim 1 wherein:

said first heat exchanger is used for cooling an engine coolant; and said second heat exchanger is used for cooling a hydraulic fluid.

10. A skid steer loader, comprising:

a body portion with a pair of laterally spaced sides and a divider wall mounted on an end thereof wherein the sides partially define an engine compartment for housing an engine and the divider wall being disposed between the sides to separate the engine compartment from an operator's compartment said cooling system;

skid steer means mounted to said body portion;

a lift arm assembly pivotally connected with said body portion; and a cooling system as set forth in claim 1.

11. A cooling system for a skid steer loader having a body portion with a pair of laterally spaced uprights and a divider wall mounted on an end thereof, said uprights partially defining an engine compartment for housing an engine, the divider wall interposed the uprights dividing an operators compartment and the engine compartment comprising:

a frame being pivotally connected to the divider wall above said engine;

a first heat exchanger having an air intake side and an air discharge side, and being disposed between the uprights, said air discharge side being connected to said frame;

a second heat exchanger having an air inlet side and an air outlet side and being disposed between said uprights, said air outlet side being connected to said frame;

a shroud having a top and a bottom, said bottom defining an intake aperture and said top defining a discharge aperture, said top being connected to said first and second heat exchangers;

a fan positioned in the air intake aperture of the shroud;

a guard surrounding the fan, and forming an inlet and an outlet, said outlet being connected to the bottom of the shroud;

a drive mechanism having an input end and an output end, and being connected to said guard, said output end being connected to said fan, and said input end being connected to the engine; and said cooling system being pivotally movable between a first position and a second position.

12. The cooling system of claim 11 wherein the first heat exchanger is connected to the frame proximal the divider wall, and the second heat exchanger is positioned adjacent to the first heat exchanger and is connected to the frame distal the divider wall.

13. The cooling system of claim 11 wherein the guard comprises a wire mesh frame.

14. The cooling system of claim 11 further including a support mechanism being pivotally connected to the frame and to one upright, for supporting said cooling system in the second position.

15. The cooling system of claim 14 wherein said support mechanism comprises a gas spring.

16. The cooling system of claim 11 further including a protective grill positioned above the frame.

17. The cooling system of claim 16 wherein said protective grill is pivotally moveable between a first position and a second position, independent of the pivotal movement of said unitary assembly.

18. The cooling system of claim 11 wherein said drive mechanism comprises a motor.

19. The cooling system of claim 11 wherein:

said first heat exchanger is used for cooling an engine coolant; and said second heat exchanger is used for cooling a hydraulic fluid.

* * * * *